(12) United States Patent
Sotoca

(10) Patent No.: US 11,465,884 B2
(45) Date of Patent: Oct. 11, 2022

(54) COMBINED SAFETY BRAKE AND SAFETY ACTUATION MECHANISM

(71) Applicant: Otis Elevator Company, Farmington, CT (US)

(72) Inventor: Javier Munoz Sotoca, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 78 days.

(21) Appl. No.: 16/731,260

(22) Filed: Dec. 31, 2019

(65) Prior Publication Data

US 2020/0346895 A1 Nov. 5, 2020

(30) Foreign Application Priority Data

May 3, 2019 (EP) .................................. 19382333

(51) Int. Cl.
*B66B 5/22* (2006.01)
*B66B 5/00* (2006.01)
(Continued)

(52) U.S. Cl.
CPC .............. *B66B 5/22* (2013.01); *B66B 5/0031* (2013.01); *F16D 63/008* (2013.01); *F16D 2121/20* (2013.01)

(58) Field of Classification Search
CPC ........... B66B 5/22; B66B 5/16; B66B 5/0031; B66B 5/18; F16D 63/008; F16D 2121/20
See application file for complete search history.

(56) References Cited

U.S. PATENT DOCUMENTS 5,096,020 A * 3/1992 Korhonen ................. B66B 5/22
187/359
5,964,320 A * 10/1999 Kato ......................... B66B 5/22
187/375
(Continued)

FOREIGN PATENT DOCUMENTS

CN 105905743 A 8/2016
CN 109693987 A * 4/2019 ......... F16D 69/0408
(Continued)

OTHER PUBLICATIONS

Shiraishi et al., Elevator Device, English translation of description of WO 2017103969 A1, Jun. 22, 2017 (Year: 2017).*
(Continued)

*Primary Examiner* — Michael R Mansen
*Assistant Examiner* — Michelle M Lantrip
(74) *Attorney, Agent, or Firm* — Cantor Colburn LLP

(57) ABSTRACT

A safety brake for an elevator system including a car and a guide rail is provided. The safety brake is adapted to limit movement of the car in a first direction ($D_1$) along the guide rail when in a braking state and comprises: first and second braking members adapted to be wedged against the guide rail when in a braking state; and an electromagnetic actuator, wherein the safety brake is configured such that: the first and second braking members are biased towards one another in a second direction ($D_2$) substantially perpendicular to the first direction ($D_1$); the first and second braking members are held in a non-braking state spaced apart from one another and the guide rail when the electromagnetic actuator is in a first state; and when the electromagnetic actuator is in a second state, the first and second braking members are moved into the braking state.

15 Claims, 7 Drawing Sheets

(51) Int. Cl.
*F16D 63/00* (2006.01)
*F16D 121/20* (2012.01)

(56) References Cited

U.S. PATENT DOCUMENTS

| | | | | |
|---|---|---|---|---|
| 6,371,261 | B1* | 4/2002 | Thompson | B66B 5/22 |
| | | | | 187/370 |
| 8,312,972 | B2* | 11/2012 | Gremaud | B66B 5/22 |
| | | | | 187/372 |
| 9,981,826 | B2* | 5/2018 | Billard | B66B 5/24 |
| 9,981,827 | B2* | 5/2018 | Osmanbasic | F16D 59/00 |
| 10,584,014 | B2* | 3/2020 | Fauconnet | B66B 5/044 |
| 10,618,776 | B2* | 4/2020 | Hu | B66B 5/22 |
| 2002/0117357 | A1* | 8/2002 | Hugel | B66B 5/22 |
| | | | | 187/376 |
| 2008/0128218 | A1 | 6/2008 | Gremaud et al. | |
| 2015/0083533 | A1* | 3/2015 | El-Wardany | F16D 69/026 |
| | | | | 188/251 A |
| 2016/0200549 | A1* | 7/2016 | Billard | B66B 5/24 |
| | | | | 188/65.1 |
| 2016/0289045 | A1* | 10/2016 | Osmanbasic | F16D 63/008 |
| 2017/0217726 | A1* | 8/2017 | Guilani | B66B 5/22 |
| 2017/0283215 | A1* | 10/2017 | Hu | B66B 5/22 |
| 2018/0118516 | A1* | 5/2018 | Marti | B66B 5/22 |
| 2019/0144240 | A1* | 5/2019 | Steinhauer | B66B 5/22 |
| | | | | 187/376 |
| 2019/0308846 | A1* | 10/2019 | Koskinen | B66B 5/0087 |

FOREIGN PATENT DOCUMENTS

| | | | | |
|---|---|---|---|---|
| DE | 102014004356 A1 | | 10/2015 | |
| EP | 2725257 A1 | * | 4/2014 | ......... F16D 69/0408 |
| JP | H05238659 A | * | 9/1993 | |
| WO | WO-2006033144 A1 | * | 3/2006 | ............ B66B 7/047 |
| WO | WO-2016058256 A1 | * | 4/2016 | ............. B66B 5/02 |
| WO | WO-2016162082 A1 | * | 10/2016 | ............. B66B 5/22 |
| WO | WO-2017098299 A1 | * | 6/2017 | ............ B66B 5/044 |
| WO | WO-2017103969 A1 | * | 6/2017 | ............... B66B 7/02 |

OTHER PUBLICATIONS

European Search Report for application EP 19382333.3, dated Dec. 20, 2019, 39 pages.

EP Opposition for Application No. 19382333.3; Issued Nov. 4, 2021; 7 Pages.

\* cited by examiner

COMBINED SAFETY BRAKE AND SAFETY ACTUATION MECHANISM

FOREIGN PRIORITY

This application claims priority to European Patent Application No. 19382333.3, filed May 3, 2019, and all the benefits accruing therefrom under 35 U.S.C. § 119, the contents of which in its entirety are herein incorporated by reference.

TECHNICAL FIELD

This disclosure relates to a safety brake and a safety brake actuation mechanism to be used for example in a hoisted structure.

BACKGROUND

It is known in the art to provide a safety system in a hoisted structure such as an elevator system, the safety system being adapted to stop the elevator system when it rotates at excessive speeds or the elevator cab travels at excessive speeds. Conventional safety systems may include a safety brake adapted to be wedged against a guide rail of the elevator system when moved from a non-braking state to a braking state. The safety brake may be moved from the non-braking state to the braking state by a mechanical link which is activated by a governor.

In a known alternative, an electrical activation system may be provided. In one such alternative system, the safety brake may be mechanically linked to a separate electronic safety actuator comprising one or more magnetic brake pads which are adapted to engage with the guide rail of the elevator system and are mechanically linked to the safety brake to cause the safety brake to be moved from the non-braking state to the braking state when the magnetic brake pads engage with the guide rail.

The present disclosure seeks to provide an improved and simplified safety brake and electrical activation system for an elevator system.

SUMMARY

According to a first aspect of the disclosure there is provided a safety brake for an elevator system including a car and a guide rail, the safety brake adapted to limit movement of the car in a first direction along the guide rail when in a braking state, the safety brake comprising: first and second braking members adapted to be wedged against the guide rail when in a braking state; and an electromagnetic actuator, wherein the safety brake is configured such that: the first and second braking members are biased towards one another in a second direction substantially perpendicular to the first direction; the first and second braking members are held in a non-braking state spaced apart from one another and the guide rail when the electromagnetic actuator is in a first state; and such that, when the electromagnetic actuator is in a second state, the first and second braking members are moved into the braking state.

From a further aspect, the present disclosure may provide an elevator system including, a car, a guide rail and a safety brake adapted to limit movement of the car in a first direction along the guide rail when in a braking state, the safety brake comprising: first and second braking members adapted to be wedged against the guide rail when in a braking state; and an electromagnetic actuator, wherein the safety brake is configured such that: the first and second braking members are biased towards one another in a second direction substantially perpendicular to the first direction; the first and second braking members are held in a non-braking state spaced apart from one another and the guide rail when the electromagnetic actuator is in a first state; and such that, when the electromagnetic actuator is in a second state, the first and second braking members are moved into the braking state.

It will be understood that the safety brake and elevator system according to the present disclosure provide an electronically activated safety brake which does not require a separate electronic safety actuator safety actuation mechanism (ESA SAM) to be provided. Rather, the combined action of the first and second braking members being biased towards one another and the electromagnetic actuator allows the safety brake to be moved directly from a non-braking state into a braking state when the electromagnetic actuator changes from a first state to a second state. Thus, a combined safety brake and electronic safety actuation device is provided.

In addition to the above, the reduced number of parts required in the safety brake and elevator system according to the present disclosure will lead to cost and time savings in manufacturing.

In any example of the disclosure, the electromagnetic actuator could be in the first state when a current above a predetermined threshold level is supplied thereto and could switch to the second state when the current supplied thereto falls below the predetermined threshold level. Preferably, the predetermined threshold level could be zero, such that optionally, the electromagnetic actuator could be in the first state when power is supplied thereto and could switch to the second state when power to the electromagnetic actuator is cut. In any example of the disclosure, the electromagnetic actuator may act to hold the first and second braking members in the non-braking state when in the first state and may act to release the first and second braking members to allow them to move into the braking state when in the second state.

In any example of the present disclosure, the first and second braking members may be biased towards one another by a resilient member.

Alternatively, or in addition to the above, the first and second braking members may be biased towards one another by a magnet.

Alternatively, or in addition to the above, at least one of the first and second braking members may be magnetised so as to bias the first and second braking members towards one another. Optionally, the magnetised first and second braking members may be biased towards one another by an attraction of at least one of the first and second braking members towards the guide rail.

Optionally the safety brake may be configured such that when moving into the braking state, the first and second braking members move into engagement with the guide rail and move relative to the car in a third direction opposite to the first direction.

Optionally, the first and second braking members are linked together to allow movement between the first and second braking members only in the second direction.

The safety brake could be mounted directly to a part of the elevator system such as a support frame of the elevator car for example. Preferably however, in any example of the disclosure, the safety brake may comprise a housing. The housing may comprise a mounting plate or an enclosure. The housing may be mounted to the elevator system and may protect parts of the safety brake from damage.

In any example of the disclosure, a guide mechanism is optionally provided in the housing to guide the first and second braking members between the non-braking state and the braking state.

The guide mechanism could take any suitable form. In any example of the disclosure, the guide mechanism may optionally comprise a guide channel formed in the housing, and a pin provided on the first or second braking member may be slidably received within the guide channel.

In any example of the disclosure, a portion of the guide channel may optionally extend diagonally inwardly towards the guide rail and in the third direction such that when no power is supplied to the electromagnetic actuator, the resilient member causes the pin to move along the portion of the guide channel such that the first and/or second brake member is caused to move both in the third direction and in the second direction towards the guide rail.

In any example of the disclosure, the guide mechanism may optionally comprise a first guide channel for receiving a pin provided on the first braking member and a second guide channel for receiving a pin provided on the second braking member.

In any example of the disclosure, the first and second braking members may optionally comprise wedge shaped braking members.

The wedge shaped braking members may optionally be tapered so as to narrow in the third direction.

In any example of the disclosure, the safety brake may optionally further comprise one or more safety blocks, wherein the first and second braking members are adapted to stop against the one or more safety blocks when in the braking state. In any example of the disclosure, the safety blocks may be formed integrally with the housing.

In any example of the disclosure, the safety brake may optionally further comprise a resilient member for biasing the first and/or second braking members against the guide rail when in the braking state.

In any example of the disclosure, the electromagnetic actuator may optionally be configured to exert a force on the first braking member in the first direction when power is supplied thereto.

The elevator system according to the disclosure may further comprise a detector for detecting an abnormality in the functioning of the elevator system and a controller for cutting a power supply to the electromagnetic actuator when the abnormality is detected.

DRAWING DESCRIPTION

Certain preferred examples of this disclosure will now be described, by way of example only, with reference to the accompanying drawings, in which.

DETAILED DESCRIPTION

Figure 1:
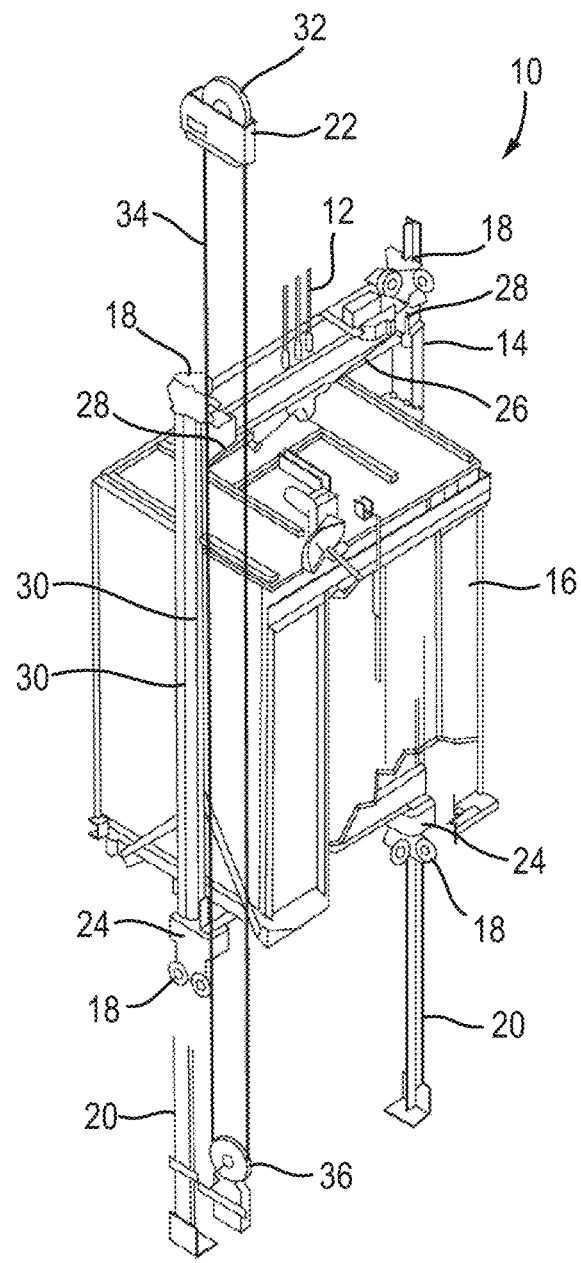
FIG. 1 is a schematic diagram of a known elevator system having a safety brake and employing a mechanical governor.

FIG. 1 shows an elevator system, generally indicated at 10. The elevator system 10 includes cables 12, a car frame 14, an elevator car 16, roller guides 18, guide rails 20, a governor 22, safety brake 24, linkages 26, levers 28, and lift rods 30. Governor 22 includes a governor sheave 32, rope loop 34, and a tensioning sheave 36. Cables 12 are connected to car frame 14 and a counterweight (not shown in FIG. 1) inside a hoistway. Elevator car 16, which is attached to car frame 14, moves up and down the hoistway by force transmitted through cables or belts 12 to car frame 14 by an elevator drive (not shown) commonly located in a machine room at the top of the hoistway. Roller guides 18 are attached to car frame 14 to guide the elevator car 16 up and down the hoistway along guide rail 20. Governor sheave 32 is mounted at an upper end of the hoistway. Rope loop 34 is wrapped partially around governor sheave 32 and partially around tensioning sheave 36 (located in this embodiment at a bottom end of the hoistway). Rope loop 34 is also connected to elevator car 16 at lever 28, ensuring that the angular velocity of governor sheave 32 is directly related to the speed of elevator car 16.

In the elevator system 10 shown in FIG. 1, governor 22, an electromechanical brake (not shown) located in the machine room, and the safety brake 24 act to stop elevator car 16 if it exceeds a set speed as it travels inside the hoistway. If elevator car 16 reaches an over-speed condition, governor 22 is triggered initially to engage a switch, which in turn cuts power to the elevator drive and then drops the brake to arrest movement of the drive sheave (not shown) and thereby arrest movement of elevator car 16. If, however, the elevator car 16 continues to experience an over speed condition, governor 22 may then act to trigger the safety brake 24 to arrest movement of elevator car 16. To do this, governor 22 releases a clutching device that grips the governor rope 34. Governor rope 34 is connected to the safety brake 24 through mechanical linkages 26, levers 28, and lift rods 30. As elevator car 16 continues its descent unaffected by the brake, governor rope 34, which is now prevented from moving by actuated governor 22, pulls on operating lever 28. Operating lever 28 "sets" the safety brake 24 by moving linkages 26 connected to lift rods 30, which lift rods 30 cause the safety brake 24 to engage guide rails 20 to bring elevator car 16 to a stop.

Mechanical speed governor systems are being replaced in some elevators by electronic systems. Existing electronic safety actuators are known that include an electronic elevator safety actuation device that is suitable for actuating and resetting a safety brake that has one or more sliding wedges to engage a guide rail of an elevator system. The electronic elevator safety actuation device may be mounted to the car frame of an elevator car 16 and may comprise one or more electromagnetic actuators adapted to cause one or more brake pads (such as magnetic brake pads for example) to engage with the guide rail if triggered by a detected overspeed condition. Engagement of the brake pad(s) with the guide rail will pull the safety brake in an upward direction via a mechanical link due to relative upward movement of the brake pad(s) relative to the descending elevator car. The safety brake (i.e. the one or more sliding wedges), when pulled upwardly as described above, will engage the guide rail to arrest the motion of the elevator car.

An example electronic safety actuator and safety brake according to the present disclosure will now be described with reference to FIGS. 2 to 5.

In one example of the disclosure, the safety brake may be used in an elevator system similar to that shown in FIG. 1 in which a guide rail 20 is provided on either side of an elevator car 16. A first safety brake according to the present disclosure may be mounted to an elevator car frame 14 below an elevator car 16 to engage with a first guide rail 20 on a first side of the elevator car 16. A second safety brake according to the present disclosure may be mounted to the elevator car frame 14 below the elevator car 16 to engage with a second guide rail on the second side of the elevator car 16. In one embodiment, the elevator system may be ropeless or hydraulically powered. In one embodiment, linear motors along the guide rails or some other form of ropeless propulsion may be provided.

Figure 2:
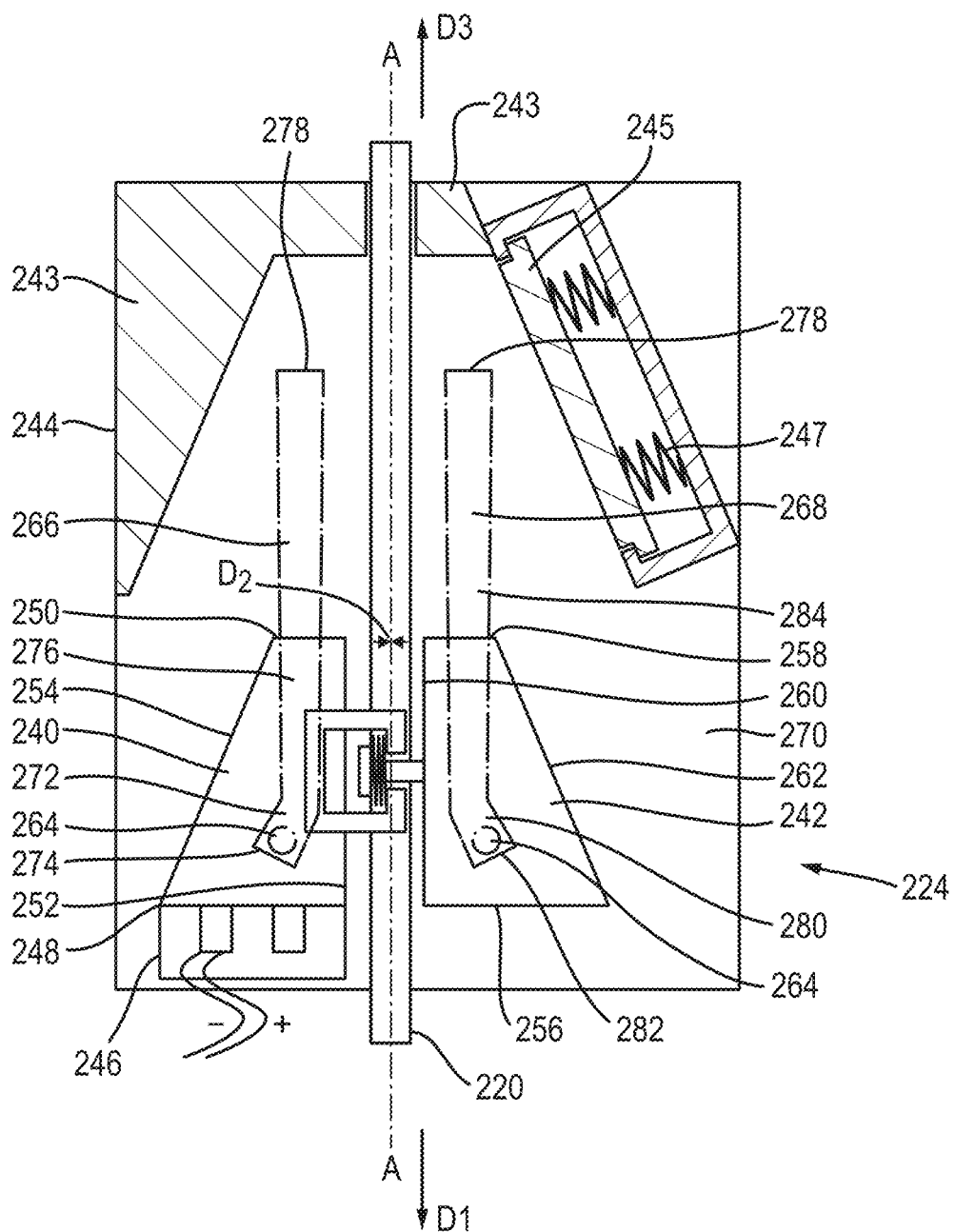
FIG. 2 is a schematic diagram of a safety brake according to the present disclosure in a non-engaged state.

As shown in FIG. 2, the safety brake 224 comprises a first wedge shaped braking member 240 disposed opposite a second wedge shaped braking member 242. The first and second wedge shaped braking members 240, 242 are slidably mounted within a housing 244. In one example of the disclosure, the housing 244 may comprise a planar structure such as a plate which can be mounted to the elevator car frame or the elevator car. In another preferred example, the housing 244 may comprise a box shape which encloses the first and second wedge shaped braking members 240, 242. In another preferred example, the housing 244 may comprise a cover plate extending across the first and second wedge shaped braking members 240, 242 to stop the first and second wedge shaped braking members 240, 242 from moving in a direction perpendicular to the longitudinal extent of the guide rail 220. An electromagnet 246 is provided in the housing 244 adjacent the first wedge shaped braking member 240. It will be understood that an electromagnet could alternatively be provided adjacent the second wedge shaped braking member 242 or that a respective electromagnet could be provided adjacent each of the first and second wedge shaped braking members 240, 242.

In one example of the disclosure, the first and/or second wedge shaped braking members 240, 242 may comprise ferromagnetic material such as steel such that, when the electromagnet is powered, the electromagnet 246 acts to hold the first wedge shaped braking member 240 in a first position adjacent to it.

As seen in FIG. 2, the first and second wedge shaped braking members 240, 242 are adapted to extend one on either side of a guide rail 220 of an elevator system in use. The guide rail 220 defines a longitudinal axis A-A along which an elevator car may move in a first direction $D_1$ or an opposite direction (the third direction, $D_3$). In one preferred example, the first and third directions $D_1$ and $D_3$ correspond to vertically downward and upward movement respectively although it will be understood that other directions of movement including horizontal movement would also be possible and are included within the scope of the disclosure. It will further be understood that the description above of first and second safety brakes mounted to an elevator car frame 14 below an elevator car 16 refers to the first and second safety brakes being mounted to the elevator car frame 14 beyond the elevator car 16 in the first direction $D_1$.

Figure 3A:
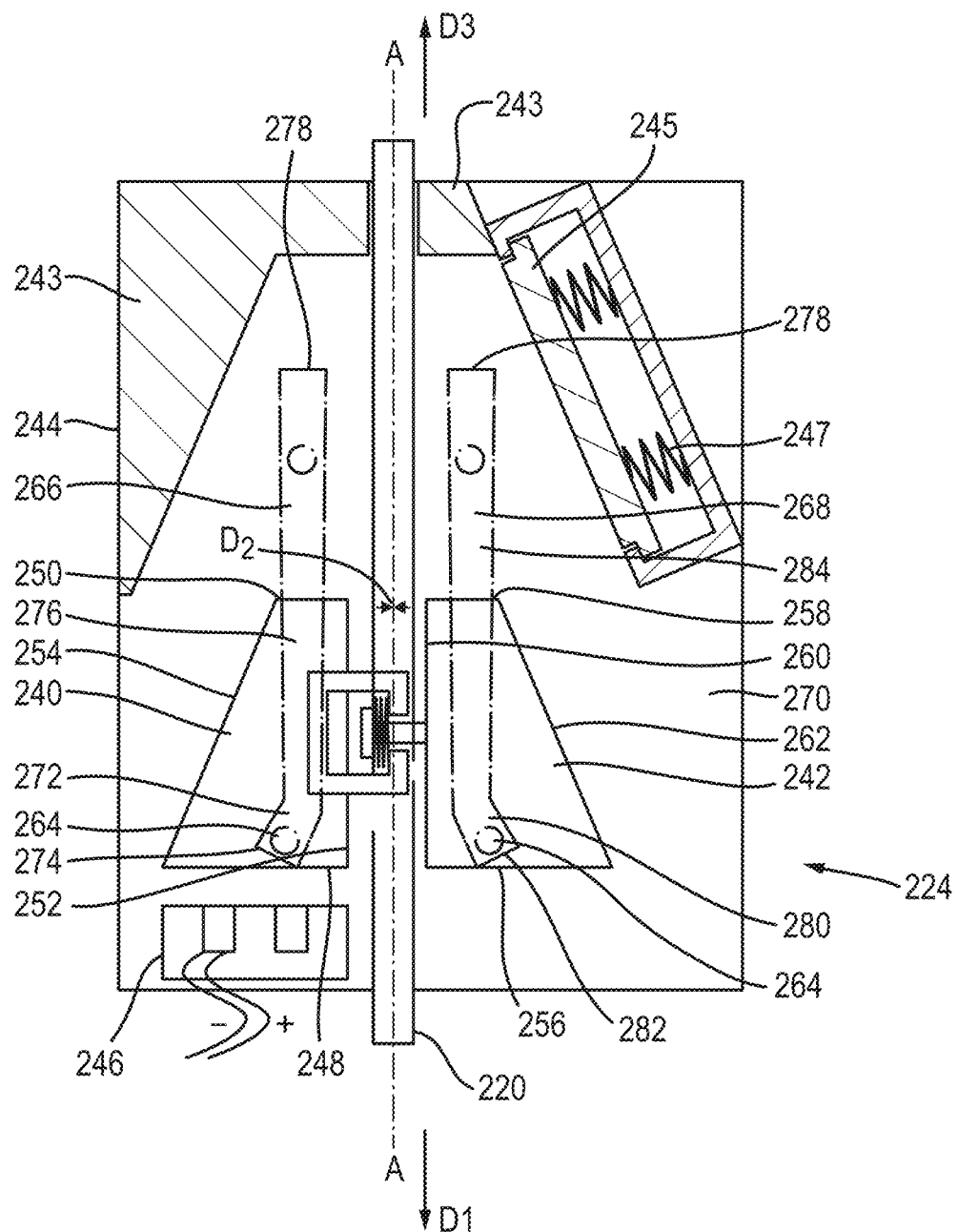
FIG. 3A is a schematic diagram of the safety brake of FIG. 2 in an intermediate state.
Figure 3B:
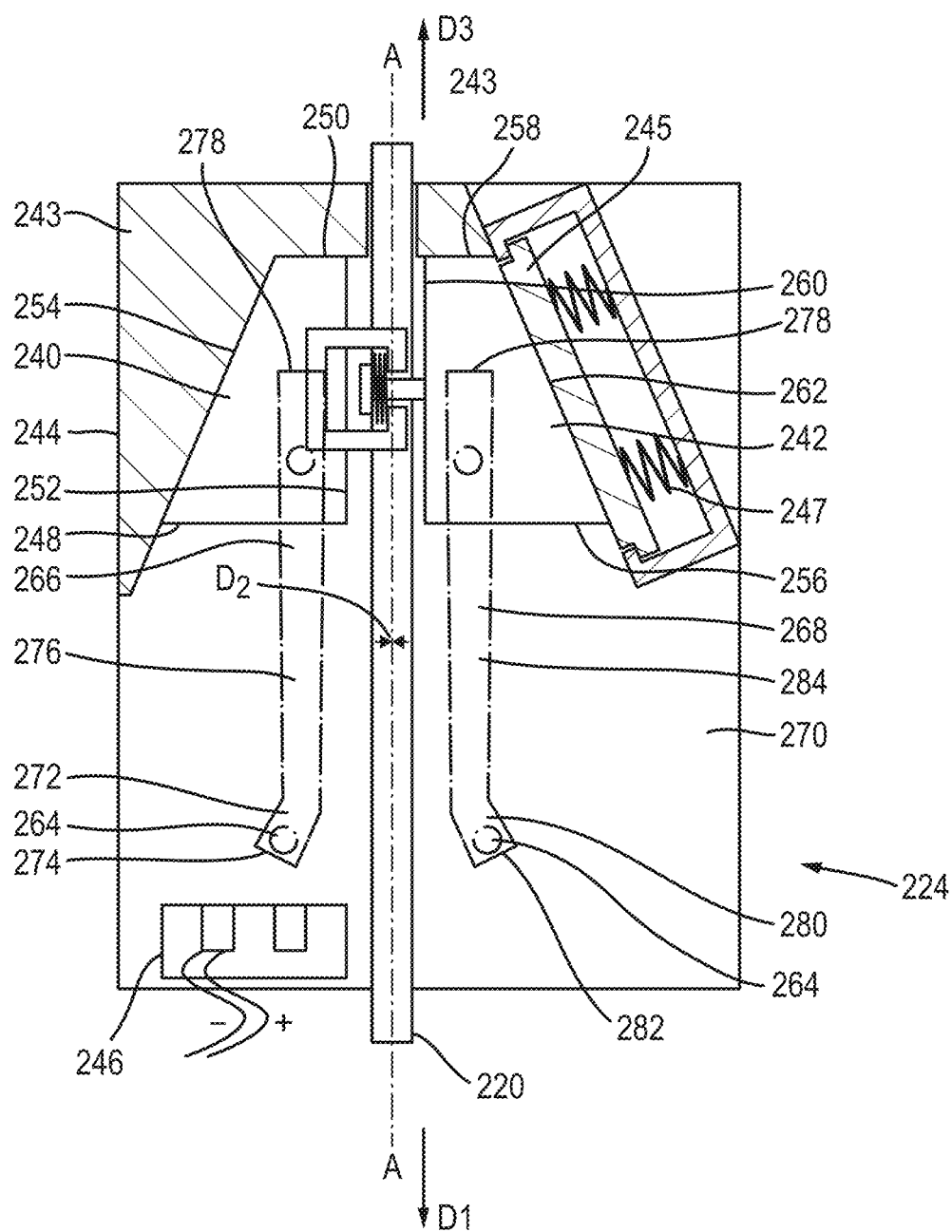
FIG. 3B is a schematic diagram of the safety brake of FIG. 2 in an engaged state.

As will be discussed in further detail below, FIG. 2 shows an example safety brake in the non-braking state and FIGS. 3A and 3B show the safety brake of FIG. 2 in an intermediate state and in the braking state respectively.

Figure 4:
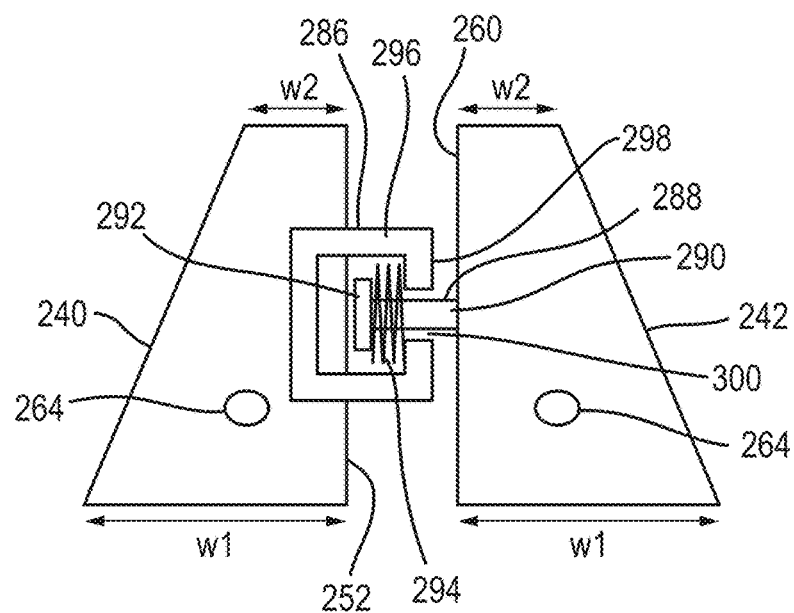
FIG. 4 is a schematic diagram of first and second wedge shaped braking members of a safety brake according to the present disclosure.

As seen more clearly in FIG. 4, which shows the wedge shaped braking members according to one example of the disclosure in cross section, the first wedge shaped braking member 240 comprises a first end 248 having a width $W_1$ and a second end 250 opposite the first end 248, the second end 250 having a width $W_2$, where $W_2<W_1$. A first braking surface 252 of the first wedge shaped braking member 240 extends substantially parallel to the longitudinal axis A-A between the first and second ends 248, 250 and is adapted to contact the guide rail 220 when the safety brake 224 is engaged. A second surface 254 extends at an angle to the longitudinal axis A-A between the first and second ends 248, 250 on the other side of the first wedge shaped braking member 240 from the first braking surface 252.

The second wedge shaped braking member 242 comprises a first end 256 having the width $W_1$ and a second end 258 opposite the first end 256, the second end 258 having the width $W_2$. A first braking surface 260 of the second wedge shaped braking member 242 extends substantially parallel to the longitudinal axis A-A between the first and second ends 256, 258 and is adapted to contact the guide rail 220 when the safety brake 224 is engaged. A second surface 262 extends at an angle to the longitudinal axis A-A between the first and second ends 256, 258 on the other side of the second wedge shaped braking member 242 from the first braking surface 260. In the example of the disclosure shown in FIG. 4, the first and second wedge shaped braking members 240, 242 are substantially the same shape and size and may be made from the same material. It will be understood that in alternative examples of the disclosure, the first and second wedge shaped braking members may be formed of different materials, may be of different sizes and/or may have different shapes from one another.

In the example of FIGS. 2, 3A and 3B, the electromagnet 246 is arranged adjacent the first end 248 of the first wedge shaped braking member 240.

The first and second wedge shaped braking members 240, 242 are arranged within the housing 244 to allow movement of the first and second wedge shaped braking members 240, 242 in the first and third directions ($D_1$ and $D_3$) relative to the housing 244. Safety blocks 243 are provided in the housing for engaging with the first and second wedge shaped braking members 240, 242 as will be described further below. The safety blocks 243 may be formed as an integral part of the housing 244 such that the safety blocks 243 and the housing 244 form a single component. A resilient member such as a bending bar 245 for providing a braking force when the first and second wedge shaped braking members 240, 242 are engaged with the safety blocks 243 may also be provided.

To guide movement of the first and second wedge shaped braking members 240, 242, a pin 264 is provided extending outwardly from each of the first and second wedge shaped braking members 240, 242. In the example shown, the pin 264 extends substantially perpendicular to both the first braking surface 252, 260 and the first end 248, 256. First and second guide channels or grooves 266, 268 in which the respective pins 264 are received and along which the pins 264 may travel, are formed in a surface 270 of the housing 244.

The first channel 266 comprises: a first portion 272 which extends diagonally inwardly towards the longitudinal axis A-A from a first closed end 274; and a second portion 276 joined with the other open end of the first portion which extends substantially parallel to the longitudinal axis A-A in the third direction $D_3$ to a closed end 278. The second channel 268 comprises: a first portion 280 which extends diagonally inwardly towards the longitudinal axis A-A from a first closed end 282; and a second portion 284 joined with the other open end of the first portion 280 which extends substantially parallel to the longitudinal axis A-A in the third direction $D_3$ to a closed end 278.

Figure 5:
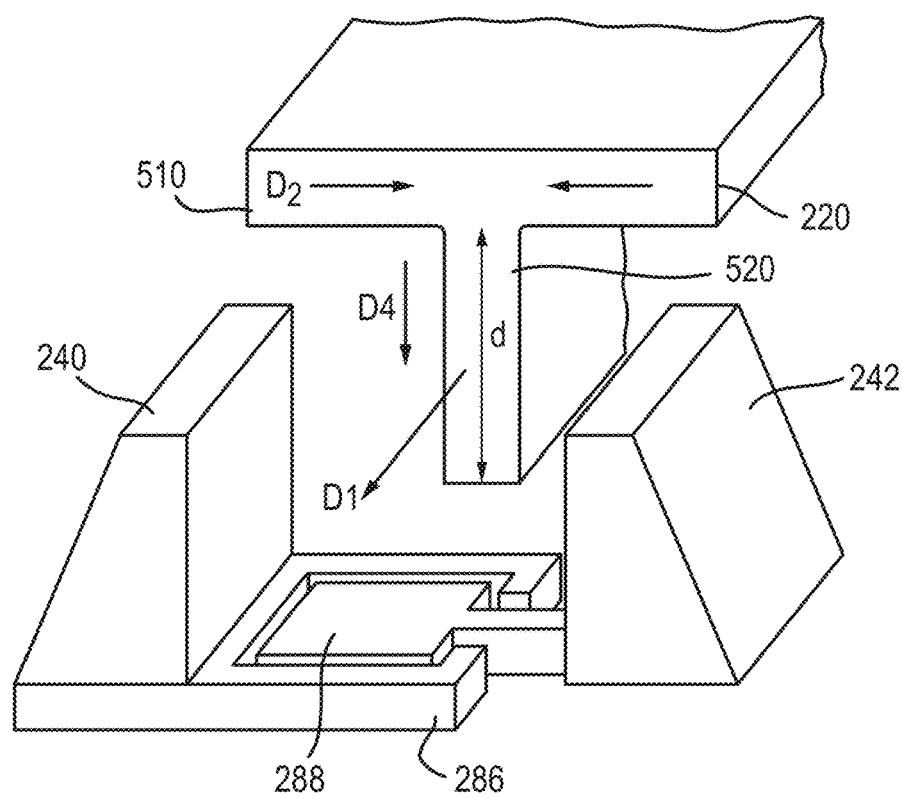
FIG. 5 is a schematic 3D diagram of first and second wedge shaped braking members of a safety brake according to the present disclosure in situ with a guide rail.

As seen more clearly in FIGS. 4 and 5, a female slider 286 is provided on the first wedge shaped braking member 240. The female slider 286 extends outwardly from or adjacent to the first braking surface 252 of the first wedge shaped braking member 240 and is adapted to receive a male slider 288 which extends outwardly from or adjacent to the first braking surface 260 of the second wedge shaped braking member 242. Thus, the female slider 286 comprises a housing 296 having an end wall 298 extending parallel to the first braking surface 252 of the first wedge shaped braking member 240. An opening 300 is provided in the end wall 298. The female slider 286 may extend outwardly from the first braking surface 252 of the first wedge shaped braking member 240 adjacent to the first end 248 thereof. Alternatively, the female slider 286 may be attached to the first end 248 of the first wedge shaped braking member 240 so as to extend outwardly therefrom in a direction substantially perpendicular to the first braking surface 252 of the first wedge shaped braking member 240.

The male slider 288 comprises a shaft 290 extending substantially perpendicular to the longitudinal axis A-A and towards the first wedge shaped braking member 240. A flange or stop member 292 is provided at the end of the shaft 290 removed from the first braking surface 260 and resilient means such as a pre-compressed spring 294 are mounted to the shaft 290. In alternative examples of the disclosure, the resilient means may comprise alternative means such as for example, a rubber or urethane bumper, an air spring, a coil spring or a magnetic spring.

As seen in FIG. 4, the shaft 290 of the male slider 288 extends through the opening 300 in the housing 296 and the spring 294 extends between the end wall 298 and the stop member 292 so as to resiliently bias the first and second wedge shaped braking members 240, 242 towards each other in a second direction $D_2$ substantially perpendicular to the first and third directions $D_1$, $D_3$. It will be understood that the structure shown in FIG. 4 is only exemplary and that other alternative arrangements could be provided to allow a resilient member such as spring 294 to bias the first and second wedge shaped braking members 240, 242 towards each other.

As seen in FIG. 5, the guide rail 220 may be T-shaped when viewed in cross section along the longitudinal extent thereof, the guide rail 220 having a first part 510 which is substantially rectangular in cross section extending in the second direction $D_2$. A second part 520 which is also substantially rectangular in cross section extends from the midpoint of the first part 510 in a fourth direction $D_4$ perpendicular to both the first ($D_1$) and second ($D_2$) directions over the depth d of the guide rail 220. The wedge shaped braking members 240, 242 are configured to extend over at least part of the depth d of the guide rail 220 and to extend outwardly beyond the guide rail 220 in the fourth direction $D_4$. The male and female sliders 288, 286 are positioned on the wedge shaped braking members 240, 242 so as to extend between the wedge shaped braking members 240, 242 in front of the guide rail 220, i.e. the male and female sliders 288, 286 are positioned such that they are located beyond the guide rail 220 in the fourth direction $D_4$.

It will be understood that FIGS. 2 to 4 show only one possible example of the safety brake according to the disclosure. In an alternative example of the disclosure, one or more magnets may be provided, adjacent the guide rail 220 for example, to act to pull the first and second wedge shaped braking members 240, 242 towards the one or more magnets so as to bias the first and second wedge shaped braking members 240, 242 towards each other in the second direction. In such an example, no spring 294 need be provided.

Figure 6:
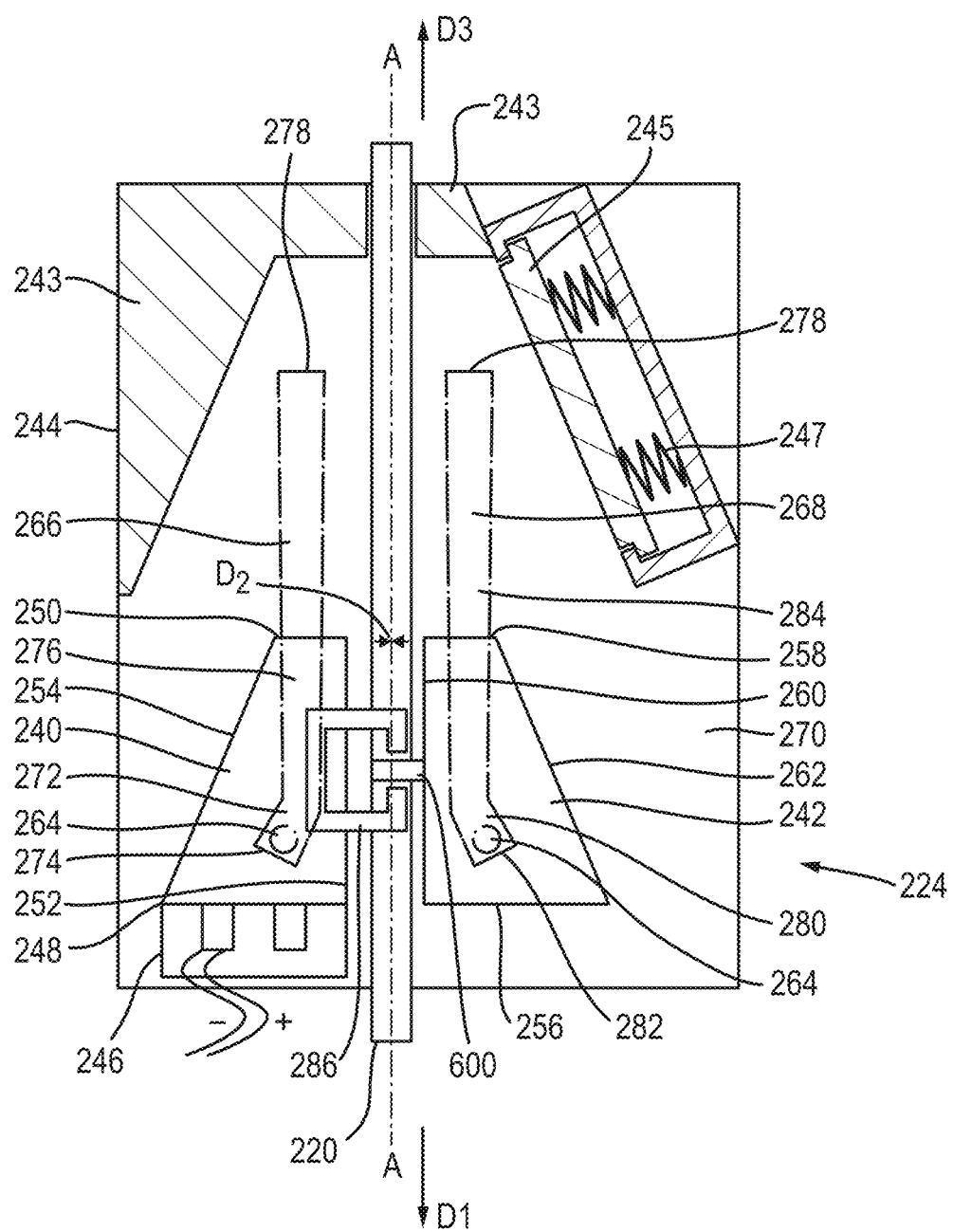
FIG. 6 is a schematic diagram of an alternative safety brake according to the present disclosure in a non-engaged state.

One example of a safety brake according to the disclosure using a magnet instead of the spring 294 is shown in FIG. 6. In this example, the housing 244, guide channels 266, 268, safety blocks 243, first and second wedge shaped braking members 240, 242, female slider 286, guide rail 220 and electromagnet 246 are substantially the same as those described with reference to FIGS. 2 to 4. A permanent magnet 600 is provided extending outwardly from the first braking surface 260 of the second wedge shaped braking member 242. The permanent magnet 600 is shaped to extend into and be received within the female slider 286 in the same way as the shaft 290 of the male slider 288 of FIG. 4. The permanent magnet 600 acts to pull the first wedge shaped braking member 240 towards it, thus biasing the first and second wedge shaped braking members 240, 242 towards each other in a manner similar to the spring 294 of FIGS. 2 to 4.

Figure 7:
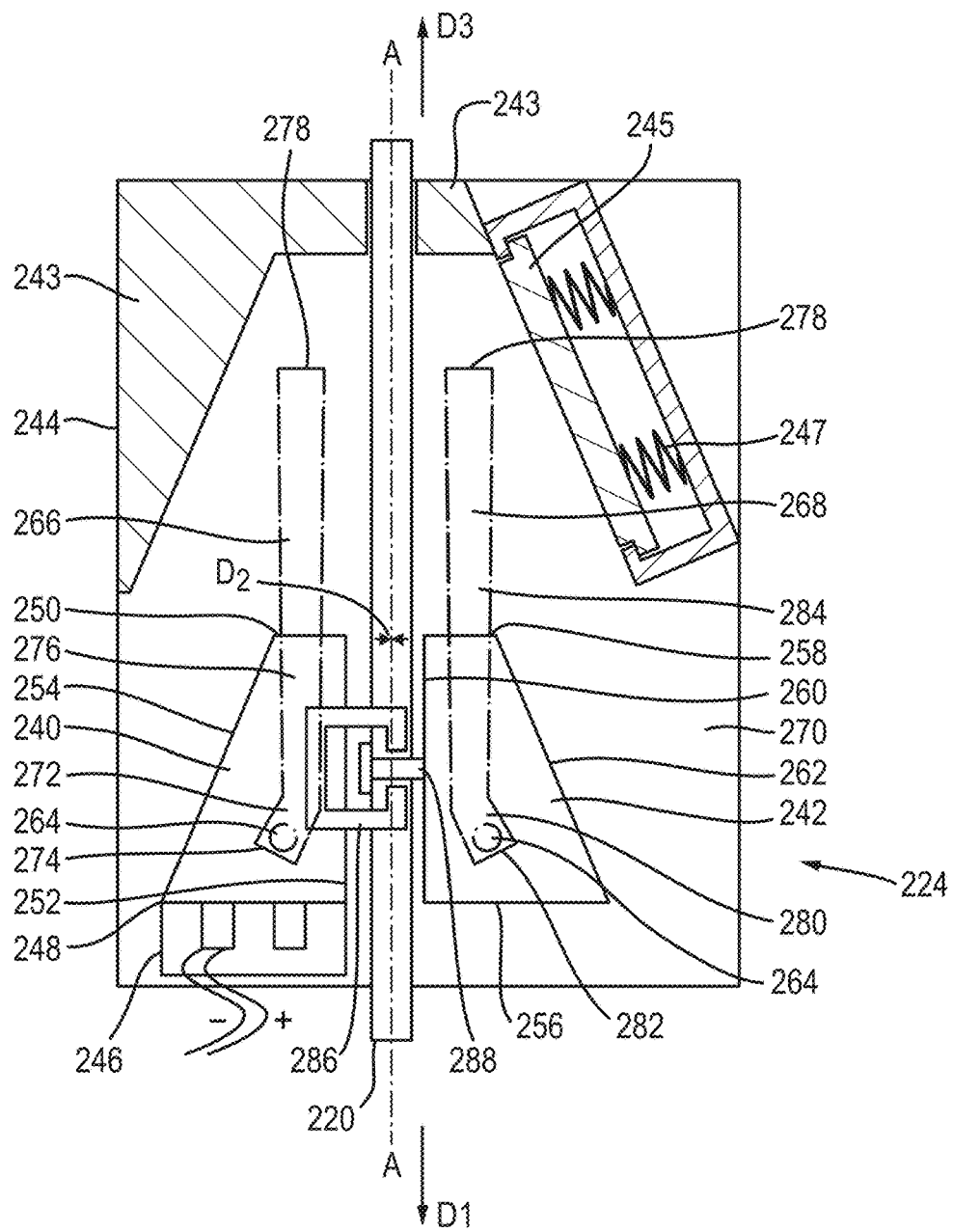
FIG. 7 is a schematic diagram of another alternative safety brake according to the present disclosure in a non-engaged state.
Figure 8:
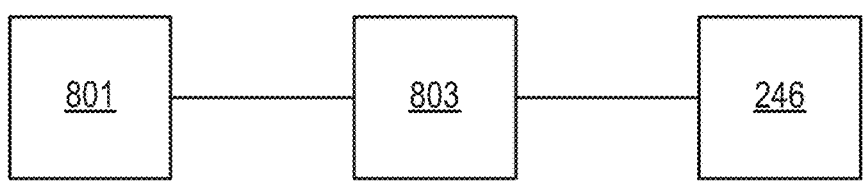
FIG. 8 is a schematic diagram of a system for controlling an elevator system according to the present disclosure.

Another alternative example of a safety brake according to the disclosure is shown in FIG. 7. In this example, the housing 244, guide channels 266, 268, safety blocks 243, first and second wedge shaped braking members 240, 242, female slider 286, male slider 288, guide rail 220 and electromagnet 246 are substantially the same as those described with reference to FIGS. 2 to 4. In the example of FIG. 7, the first and second wedge shaped braking members 240, 242 are magnetised such that the first and second wedge shaped braking members 240, 242 are attracted toward the guide rail 220 in use, thus biasing the first and second wedge shaped braking members 240, 242 towards each other in a manner similar to the example of FIGS. 2 to 4. It will be understood that in an alternative example, only one of the first and second wedge shaped braking members 240, 242 could be magnetised and could act to pull the other of the first and second wedge shaped braking members 240, 242 towards it.

When assembled in an elevator system, the housing 244 may be mounted to an elevator car frame as described above in relation to FIG. 1. The operation of the safety brake and electronic actuator according to the present disclosure will now be described with reference to FIGS. 2, 3A, 3B and 8.

As shown in FIG. 2, when the elevator system is operating normally, the safety brake is in the dis-engaged or reset position. In this position, power is supplied to the electromagnet 246 such that the electromagnet 246 pulls the first wedge shaped braking member 240 in the second direction $D_2$ to hold the first wedge shaped braking member 240 to the electromagnet 246. When in this position, the pins 264 of the respective first and second wedge shaped braking members 240, 242 are located adjacent the first ends 274, 282 of the respective first and second channels 266, 268 and are separated from each other in a direction perpendicular to the guiderail 220 by a distance great enough for a gap to be formed between the respective first braking surfaces 252, 260 of the first and second wedge shaped braking members 240, 242 and the respective sides of the guide rail 220.

When an abnormality in the functioning of the elevator is detected by a detector 801, power to the electromagnet 246 is cut by a controller 803 so as to release the first wedge shaped braking member 240. The power to the electromagnet 246 may be cut due to a failure in the power supply, due to detection of an abnormality such as an overspeed or over acceleration condition, or due to the power supply being shut down manually or by a controller.

When the first wedge shaped braking member 240 is released by the electromagnet 246, the biasing force of the spring member 294 acts to pull the first wedge shaped braking member 240 and the second wedge shaped braking member 242 towards one another, while the mating male 288 and female 286 sliders are configured so as to restrict relative movement between the first wedge shaped braking member 240 and the second wedge shaped braking member 242 in the first and third directions $D_1$, $D_3$. Thus the pins 264 will be pulled along the diagonal first portions 272, 280 of the respective first and second channels 266, 268 to an intermediate position shown at A. This combined with the relative movement of the elevator car in direction $D_1$ relative to the guide rail 220 will cause the first wedge shaped braking member 240 and the second wedge shaped braking member 242 to move into engagement with the safety blocks 243 and the bending bar 245 in the housing 244 thus blocking further movement of the first wedge shaped braking member 240 and the second wedge shaped braking member 242 relative to the housing. When in engagement with the bending bar 245, biasing means such as springs 247 act to push the second wedge shaped braking member 242 against the guide rail 220, thus providing a braking force such that the first braking surfaces 252, 260 of the first and second wedge shaped braking members 240, 242 mate with the sides of the guide rail 220. In alternative examples of the disclosure, the biasing means may comprise any alternative means for providing a biasing force such as, for example, one or more air springs or a polymer or any other elastic component. Thus, the first wedge shaped braking member 240 and the second wedge shaped braking member 242 are also held against movement relative to the guide rail 220. It will be understood that in another alternative example of the disclosure, no bending bar or biasing means may be provided.

To release the safety brake according to the disclosure, power may be reinstated to the electromagnet 246, thus causing the first wedge shaped braking member 240 and the second wedge shaped braking member 242 to be pulled back along the guide rail 220 and outward relative to one another until the pins 264 of the respective first and second wedge shaped braking members 240, 242 are located adjacent the first ends 274, 282 of the respective first and second channels 266, 268.

It will be understood that the biasing force of the spring member 294 may be supplemented by or provided by other means such as for example, by a permanent magnet 600 as described above and shown in FIG. 6 or by magnetising the first and second wedge shaped braking members 240, 242 as shown in FIG. 7. A safety brake according to such alternative examples will function substantially as described above with reference to FIGS. 2 and 3A and 3B.

Although the present disclosure has been described with reference to various examples, it will be understood by those skilled in the art that various changes in form and detail may be made without departing from the scope of the disclosure as set forth in the accompanying claims.

What is claimed is:

1. A safety brake for an elevator system including a car and a guide rail, the safety brake adapted to limit movement of the car in a first direction along the guide rail when in a braking state, the safety brake comprising:
first and second braking members adapted to be wedged against the guide rail when in a braking state; and
an electromagnetic actuator,
wherein the safety brake is configured such that:
the first and second braking members are biased towards one another in a second direction substantially perpendicular to the first direction;
the first and second braking members are held in a non-braking state spaced apart from one another and the guide rail when the electromagnetic actuator is in a first state; and
when the electromagnetic actuator is in a second state, the first and second braking members are moved into the braking state;
wherein the first and second braking members are linked together to allow movement between the first and second braking members only in the second direction, wherein the first and second braking members are biased towards one another by a member positioned between the first and second braking members.

2. A safety brake as claimed in claim 1, wherein the first and second braking members are biased towards one another by a resilient member, and/or
wherein the first and second braking members are biased towards one another by a magnet, and/or
wherein at least one of the first and second braking members is magnetised so as to bias the first and second braking members towards one another.

3. A safety brake as claimed in claim 1, further comprising a housing.

4. A safety brake as claimed in claim 3, wherein a guide mechanism is provided in the housing to guide the first and second braking members between the non-braking state and the braking state.

5. A safety brake as claimed in claim 4, wherein the guide mechanism comprises a guide channel formed in the housing, and wherein a pin provided on the first or second braking member is slidably received within the guide channel.

6. A safety brake as claimed in claim 5, wherein a portion of the guide channel extends diagonally inwardly towards the guide rail and in a third direction such that when no power is supplied to the electromagnetic actuator, a resilient member causes the pin to move along the portion of the guide channel such that the first and/or second brake member is caused to move both in the third direction and in the second direction towards the guide rail.

7. A safety brake as claimed in claim 5, wherein the guide channel comprises a first guide channel for receiving a pin provided on the first braking member and a second guide channel for receiving a pin provided on the second braking member.

8. A safety brake as claimed in claim 1, wherein the first and second braking members comprise wedge shaped braking members.

9. A safety brake as claimed in claim 8, wherein the wedge shaped braking members are tapered so as to narrow in a third direction.

10. A safety brake as claimed in claim 1, further comprising one or more safety blocks, wherein the first and second braking members are adapted to stop against the one or more safety blocks when in the braking state.

11. A safety brake as claimed in claim 1, further comprising a resilient member for biasing the first and/or second braking members against the guide rail when in the braking state.

12. A safety brake as claimed in claim 1, wherein the electromagnetic actuator is configured to exert a force on the first braking member in the first direction when power is supplied thereto.

13. An elevator system including, a car, a guide rail and a safety brake as claimed in claim 1.

14. An elevator system as claimed in claim 13, further comprising a detector for detecting an abnormality in the functioning of the elevator system and a controller for cutting a power supply to the electromagnetic actuator when the abnormality is detected.

15. A safety brake for an elevator system including a car and a guide rail, the safety brake adapted to limit movement of the car in a first direction along the guide rail when in a braking state, the safety brake comprising:
first and second braking members adapted to be wedged against the guide rail when in a braking state; and
an electromagnetic actuator, wherein the safety brake is configured such that:
the first and second braking members are biased towards one another in a second direction substantially perpendicular to the first direction;
the first and second braking members are held in a non-braking state spaced apart from one another and the guide rail when the electromagnetic actuator is in a first state; and
when the electromagnetic actuator is in a second state, the first and second braking members are moved into the braking state;
wherein the first and second braking members are linked together to allow movement between the first and second braking members only in the second direction;
wherein the first and second braking members are biased towards one another by a resilient member;
wherein the first braking member includes a first slider extending outwardly from a first braking surface of the first braking member;
wherein the second braking member includes a second slider extending outwardly from a second braking surface of the second braking member;
wherein the resilient member is placed between the first and second braking members and the resilient member is placed between the first slider and the second slider.

* * * * *